United States Patent
Kuroiwa et al.

(10) Patent No.: US 9,712,014 B2
(45) Date of Patent: Jul. 18, 2017

(54) INSULATOR, STATOR ASSEMBLY, ROTATING ELECTRICAL MACHINE, AND CONNECTION BOARD

(71) Applicant: KABUSHIKI KAISHA YASKAWA DENKI, Kitakyushu-shi (JP)

(72) Inventors: Yasufumi Kuroiwa, Kitakyushu (JP); Kanta Yamaguchi, Kitakyushu (JP); Yoichi Kitano, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 302 days.

(21) Appl. No.: 14/451,398

(22) Filed: Aug. 4, 2014

(65) Prior Publication Data
US 2015/0042180 A1 Feb. 12, 2015

(30) Foreign Application Priority Data
Aug. 6, 2013 (JP) .................. 2013-163660

(51) Int. Cl.
*H02K 3/34* (2006.01)
*H02K 3/30* (2006.01)
*H02K 3/52* (2006.01)

(52) U.S. Cl.
CPC ............... *H02K 3/345* (2013.01); *H02K 3/30* (2013.01); *H02K 3/522* (2013.01); *H02K 2203/03* (2013.01); *H02K 2203/12* (2013.01)

(58) Field of Classification Search
CPC H02K 3/34; H02K 3/46; H02K 41/00; H02K 15/14; H02K 3/52
See application file for complete search history.

(56) References Cited

U.S. PATENT DOCUMENTS

2009/0243421 A1* 10/2009 Matsuura ............... H02K 3/522
                                                              310/215
2013/0009512 A1* 1/2013 Tashiro .................. H02K 3/522
                                                              310/215

FOREIGN PATENT DOCUMENTS

| JP | 2011-200059 | 10/2011 | |
| WO | WO 2008/099659 | 8/2008 | |
| WO | WO 2011118357 A1 * | 9/2011 | ............. H02K 3/522 |

OTHER PUBLICATIONS

Japanese Office Action for corresponding JP Application No. 2013-163660, May 22, 2015.

* cited by examiner

*Primary Examiner* — Joshua Benitez-Rosario
*Assistant Examiner* — Leda Pham
(74) *Attorney, Agent, or Firm* — Mori & Ward, LLP

(57) ABSTRACT

An insulator to be attached to a laminated core of a rotating electrical machine includes a frame-shaped body which surrounds the laminated core and around which a coil wire is wound, and first and second flanges provided at both open sides of the body. The second flange has a first recess that extends toward the body.

3 Claims, 9 Drawing Sheets

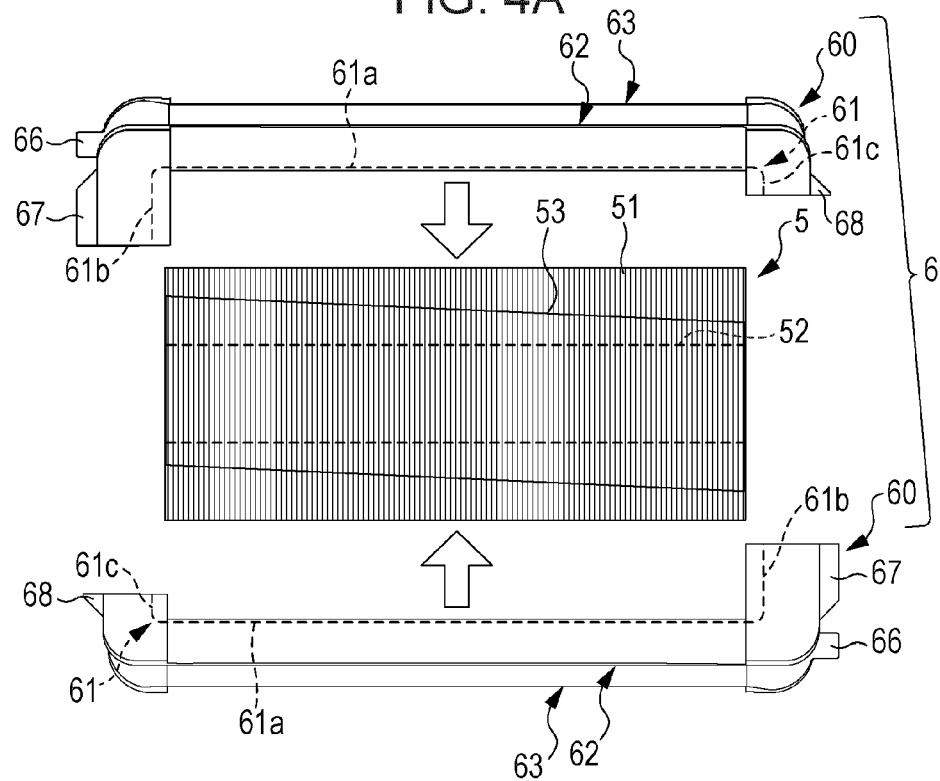
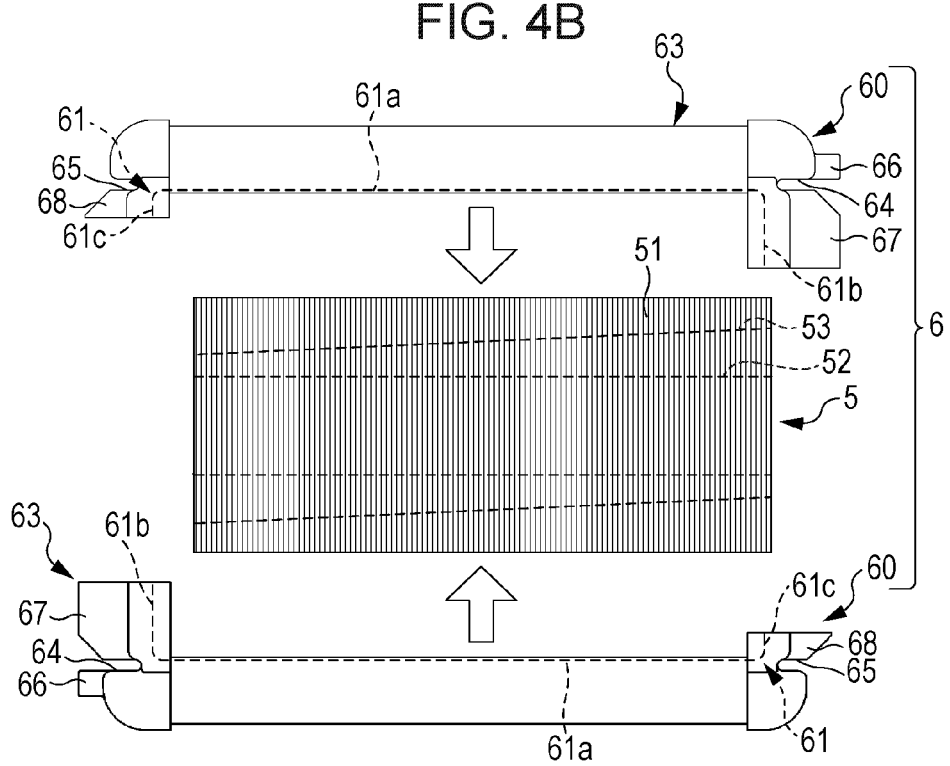

INSULATOR, STATOR ASSEMBLY, ROTATING ELECTRICAL MACHINE, AND CONNECTION BOARD

CROSS-REFERENCE TO RELATED APPLICATIONS

The present disclosure contains subject matter related to that disclosed in Japanese Priority Patent Application JP 2013-163660 filed in the Japan Patent Office on Aug. 6, 2013, the entire contents of which are hereby incorporated by reference.

BACKGROUND

1. Field of the Invention

The embodiments disclosed herein relate to an insulator, a stator assembly, a rotating electrical machine, and a connection board.

2. Description of the Related Art

International Publication No. 2008/099659 describes a structure including an insulator around which a coil wire is wound and which is formed as a combination of two resin insulation components. Each resin insulation component includes a long side portion that faces a side surface of a tooth of a laminated core and short side portions that face both end surfaces of the laminated core.

From the viewpoint of improving productivity, for example, there has been a demand for automation of a process of winding coil wires around insulators. In the structure described in International Publication No. 2008/099659, for example, automation of winding process is not taken into consideration.

SUMMARY

According to one aspect of the present disclosure, an insulator to be attached to a stator core of a rotating electrical machine includes a frame-shaped body which surrounds the stator core and around which a coil wire is wound, and a flange provided at least at one of open sides of the body. The flange has at least one recess that extends toward the body.

According to another aspect of the present disclosure, an insulator to be attached to a stator core of a rotating electrical machine includes a winding portion around which a coil wire is wound, a receiving portion in which a winding end portion of the coil wire wound around the winding portion is inserted, and a portion around which the winding end portion of the coil wire inserted in the receiving portion is bent and wound.

According to another aspect of the present disclosure, a connection board to which end portions of coil wires wound around respective insulators are to be connected includes a plurality of conductive members to be connected to the end portions to the coil wires of the respective insulators, and an insulating member that at least partially covers surfaces of the conductive members. Each of the insulators includes a body around which the corresponding coil wire is wound, and a flange that is provided on the body and that includes at least one recess that extends toward the body, at least one projection located adjacent to the recess, and a support whose height in a projecting direction is substantially the same as a height of the projection in the projecting direction. The insulating member includes first receivers that have a recessed shape and receive the projections of the flanges of the respective insulators, and second receivers that have a recessed shape and receive the supports of the flanges of the respective insulators.

BRIEF DESCRIPTION OF THE DRAWINGS

FIGS. 4A and 4B are schematic diagrams illustrating the structures of a laminated core and an insulator in the state before the insulator is attached to the laminated core.

DESCRIPTION OF THE EMBODIMENTS

An embodiment will be described with reference to the drawings.

Overall Structure of Rotating Electrical Machine

First, the overall structure of a rotating electrical machine according to the present embodiment will be described with reference to FIGS. 1 to 3.

Figure 1:
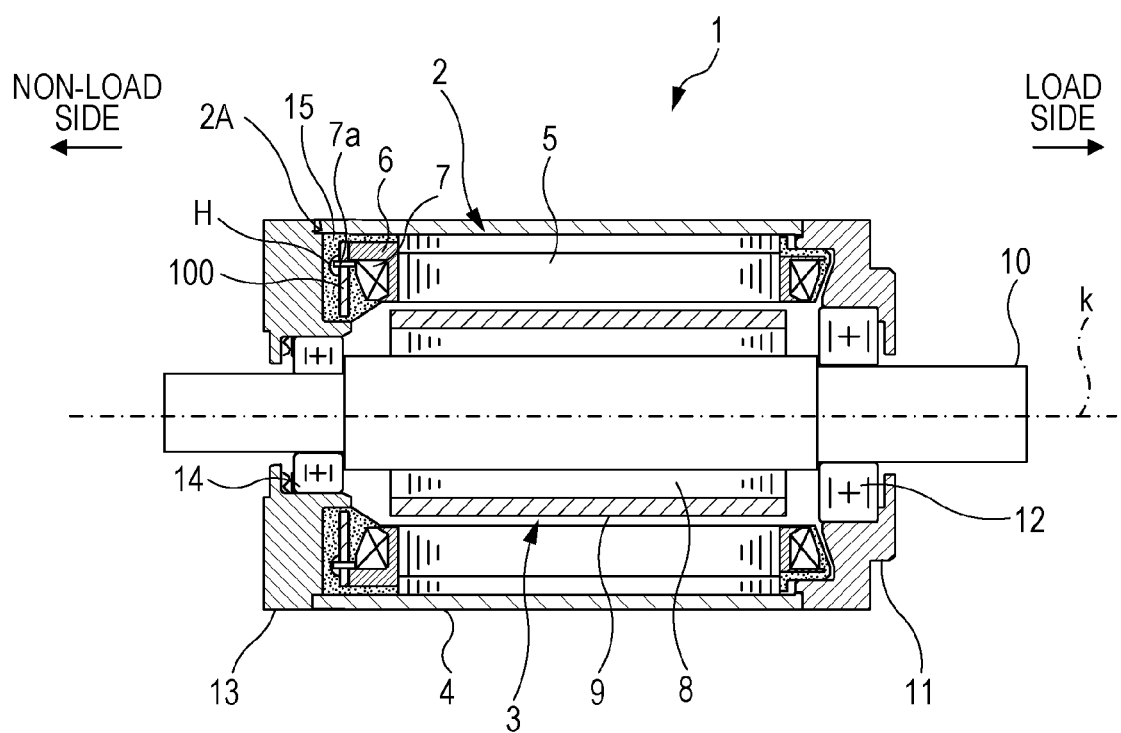
FIG. 1 is a longitudinal sectional view illustrating the overall structure of a rotating electrical machine according to an embodiment.
Figure 2:
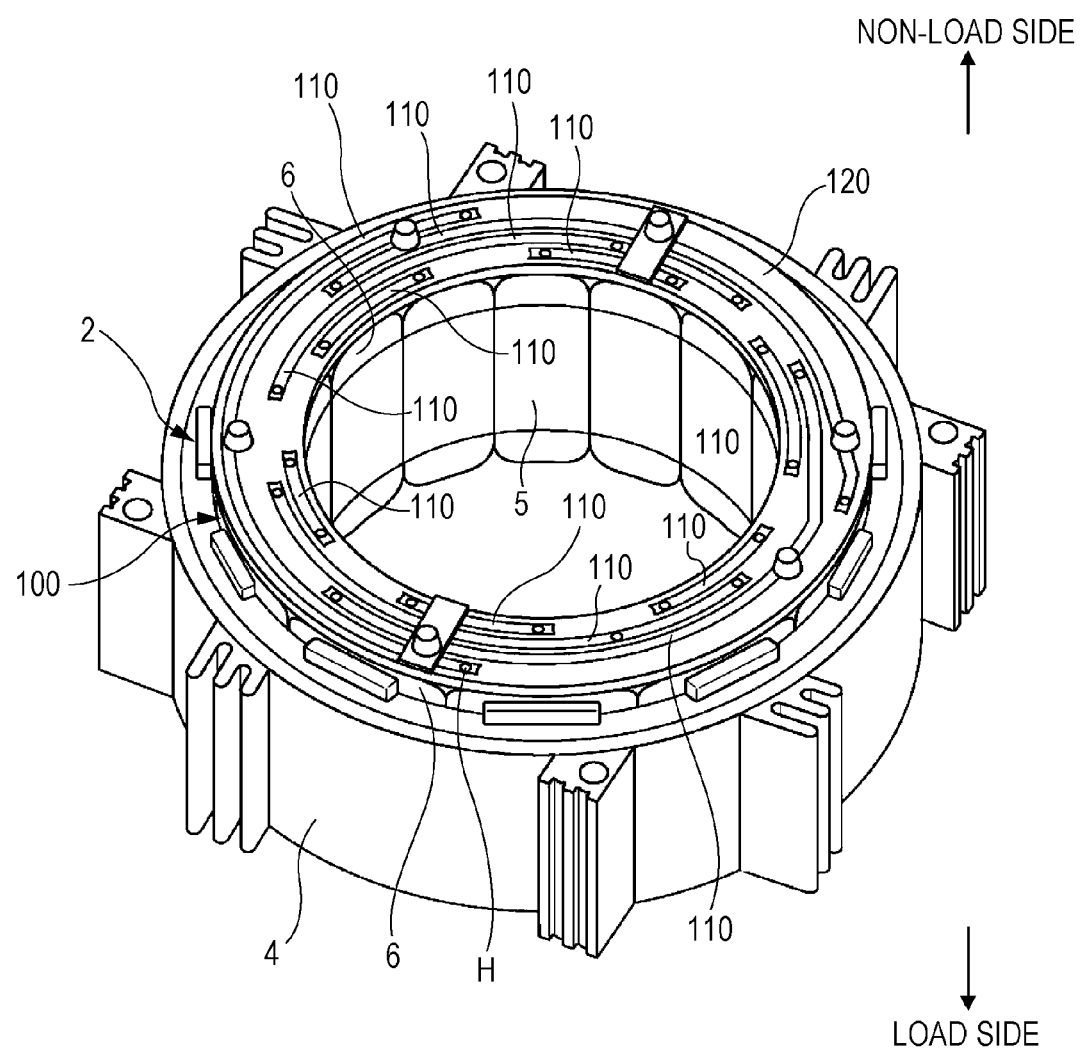
FIG. 2 is a schematic perspective view illustrating the structures of a frame, a stator, and a connection board.
Figure 3:
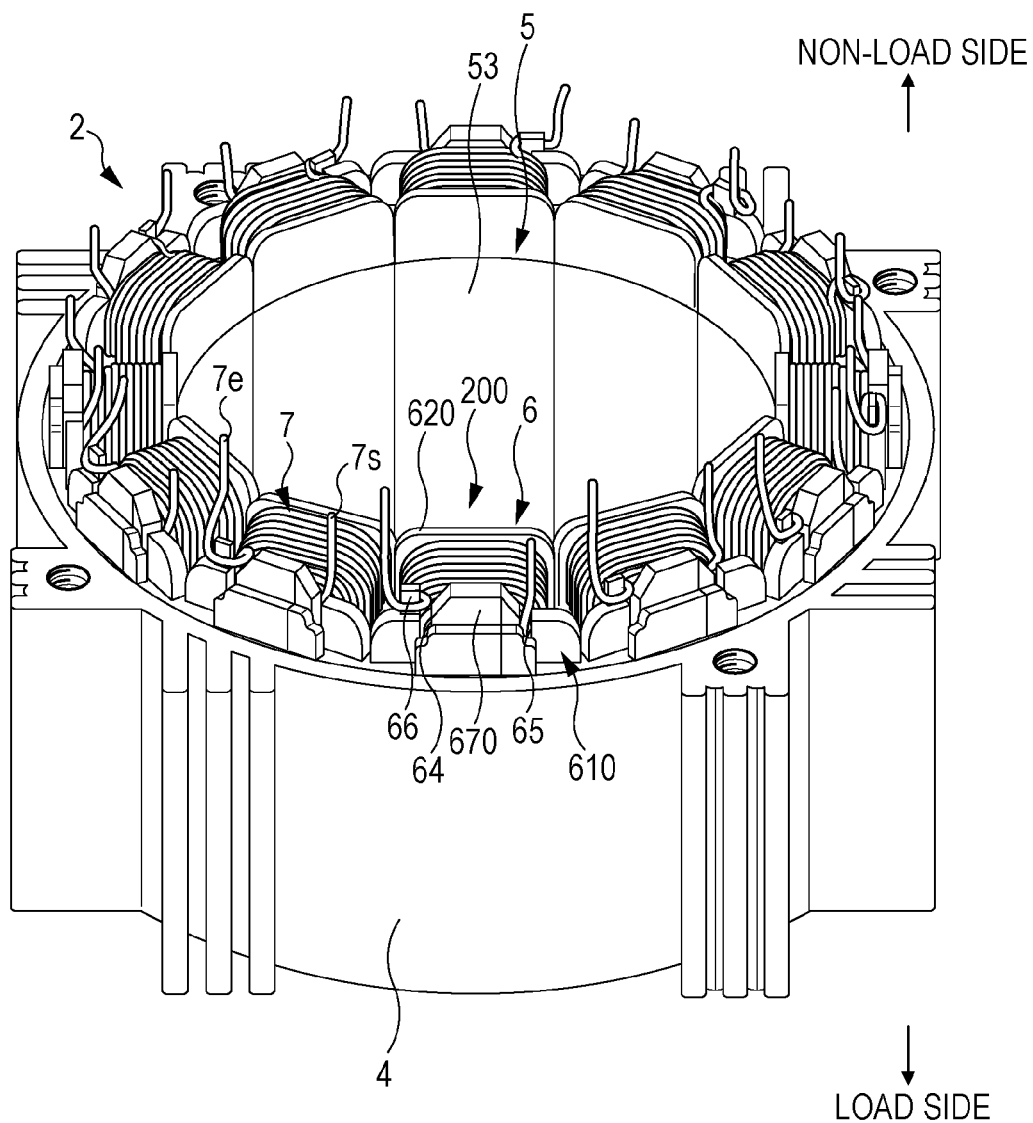
FIG. 3 is a perspective view illustrating the structures of the frame and the stator.

As illustrated in FIGS. 1 to 3, a rotating electrical machine 1 according to the present embodiment includes a stator 2 and a rotor 3, and is an inner-rotor-type electric motor in which the rotor 3 is disposed in the stator 2.

The rotating electrical machine 1 also includes a rotating shaft 10 provided on an inner peripheral side (inner side) of the stator 2, a substantially cylindrical frame 4 provided on an outer peripheral side (outer side) of the stator 2, a load-side bracket 11, and a non-load-side bracket 13. The rotating shaft 10 is supported by a load-side bearing 12, which includes an outer race fitted to the load-side bracket 11, and a non-load-side bearing 14, which includes an outer race fitted to the non-load-side bracket 13, so that the rotating shaft 10 is rotatable around an axis k that extends in an axial direction (horizontal direction in FIG. 1). The load-side bracket 11 is provided on a load-side end portion of the frame 4 so as to block an opening at the load side (right side in FIG. 1) of the frame 4. The non-load-side bracket 13 is provided on a non-load-side end portion of the frame 4 so as to block an opening at the non-load side (one side in the axial direction, left side in FIG. 1) of the frame 4.

The rotor 3 is provided on the outer peripheral surface of the rotating shaft 10, and opposes the inner peripheral surface of the stator 2 with a magnetic air gap provided therebetween in a radial direction of the rotating shaft 10 (hereinafter referred to as "rotating-shaft radial direction"). The rotor 3 includes a substantially cylindrical rotor core 8 fixed to the outer peripheral surface of the rotating shaft 10 and permanent magnets 9 embedded in the rotor core 8.

The stator 2 includes a plurality of laminated cores 5 (stator cores), a plurality of insulators 6 attached to the respective laminated cores 5, and a plurality of coil wires 7 wound around the respective insulators 6. More specifically, the stator 2 includes twelve assembly units 200, each of which includes a laminated core 5, an insulator 6, and a coil wire 7, and is formed by connecting the twelve assembly units 200 in a substantially annular shape. A substantially annular connection board 100 (connection portion), on which end portions 7a of the twelve coil wires 7 (hereinafter referred to as "coil-wire end portions 7a") are connected in a predetermined connection pattern, is provided on the non-load side of the twelve insulators 6. The coil-wire end portions 7a are fixed to the connection board 100 with solder H. The connection board 100, the twelve coil wires 7, etc., are covered together with a resin mold 15 formed of a resin that has been injected. Thus, the stator 2, the connection board 100, and the resin mold 15 form a stator assembly 2A.

Laminated Core

As illustrated in FIGS. 4A and 4B, each laminated core 5 includes a substantially arc-shaped yoke portion 51, a tooth base portion 52, and a tooth end portion 53. The tooth base portion 52 is formed so as to project from the yoke portion 51 toward the inner peripheral side (toward the near side in FIG. 4A and far side in FIG. 4B), and has a substantially rectangular parallelepiped shape. The tooth end portion 53 projects from an end of the tooth base portion 52 in a flange shape at both sides of the tooth base portion 52 in a direction orthogonal to a lamination direction (horizontal direction in FIGS. 4A and 4B), that is, in the vertical direction in FIGS. 4A and 4B.

Insulator

As illustrated in FIGS. 4A and 4B, each insulator 6 includes two insulating components 60 which have the same shape and which are formed by using a common mold, and is formed as a combination of two insulating components 60 (see FIGS. 5A and 5B, which will be described below). Each insulating component 60 includes a body portion 61, a first flange portion 62, and a second flange portion 63, and is formed such that the body portion 61, the first flange portion 62, and the second flange portion 63 are integrated together by resin molding.

The body portion 61 includes a long side portion 61a, a first short side portion 61b provided at one end of the long side portion 61a, and a second short side portion 61c that is provided at the other end of the long side portion 61a and that is shorter than the first short side portion 61b.

The first flange portion 62 projects outward in a flange shape from the edge of the body portion 61 at one side of the body portion 61 (near side in FIG. 4A and far side in FIG. 4B).

The second flange portion 63 projects outward in a flange shape from the edge of the body portion 61 at the other side of the body portion 61 (far side in FIG. 4A and near side in FIG. 4B). The second flange portion 63 projects outward from the body portion 61 by a greater distance than the first flange portion 62. The second flange portion 63 includes a first recess 64 (recess), a second recess 65, a projection 66, a first support portion 67, and a second support portion 68.

The first recess 64 is formed in the second flange portion 63 at a side corresponding to the first short side portion 61b so as to extend toward the body-portion-61 side, that is, toward the side corresponding to the second short side portion 61c.

The second recess 65 is formed in the second flange portion 63 at a side corresponding to the second short side portion 61c so as to extend toward the body-portion-61 side, that is, toward the side corresponding to the first short side portion 61b.

The projection 66 is formed on the second flange portion 63 at the side corresponding to the first short side portion 61b. The projection 66 is located adjacent to the first recess 64, and projects in a direction away from the body portion 61, that is, in a direction away from the second short side portion 61c. The projection 66 has a substantially rectangular parallelepiped shape.

The first support portion 67 is formed on the second flange portion 63 at the side corresponding to the first short side portion 61b. The first support portion 67 is located adjacent to the first recess 64, and projects in a direction away from the body portion 61, that is, in a direction away from the second short side portion 61c. The first support portion 67 has a substantially quadrangular prism shape having a flat surface at one corner thereof, and is substantially pentagonal-shaped in side view.

The second support portion 68 is formed on the second flange portion 63 at the side corresponding to the second short side portion 61c. The second support portion 68 is located adjacent to the second recess 65, and projects in a direction away from the body portion 61, that is, in a direction away from the first short side portion 61b. The second support portion 68 has a substantially quadrangular prism shape having a sharp corner, and is substantially trapezoidal-shaped in side view.

One of the two insulating components 60 is rotated by 180 degrees with respect to the other insulating component 60 so that the insulating components 60 are point symmetric. In this state, the insulating components 60 are attached to the laminated core 5 such that the body portions 61 thereof sandwich the tooth base portion 52 from both sides in the direction orthogonal to the lamination direction. Thus, engagement portions (not shown) of the two insulating components 60 are engaged with each other, and the insulator 6 is formed. Referring to FIG. 5, in the insulator 6, the two body portions 61 are combined together to form a body 610, the two first flange portions 62 are combined together to form a first flange 620, and two second flange portions 63 are combined together to form a second flange 630.

Figure 6A:
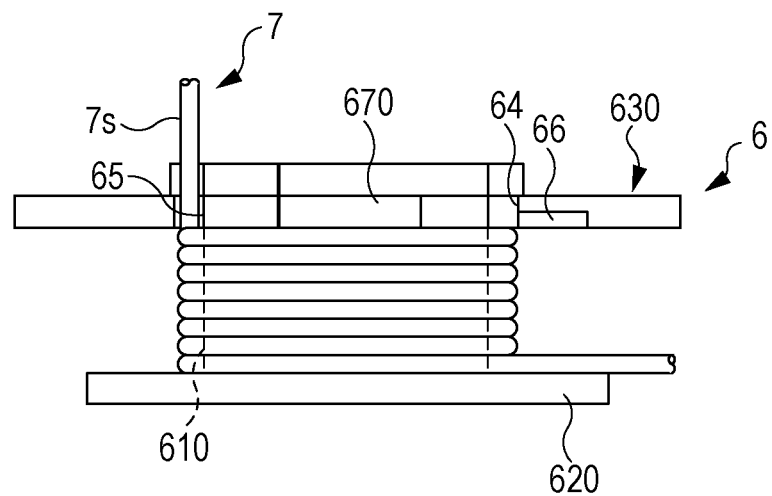
FIGS. 6A and 6B are schematic diagrams illustrating a winding process.
Figure 6B:
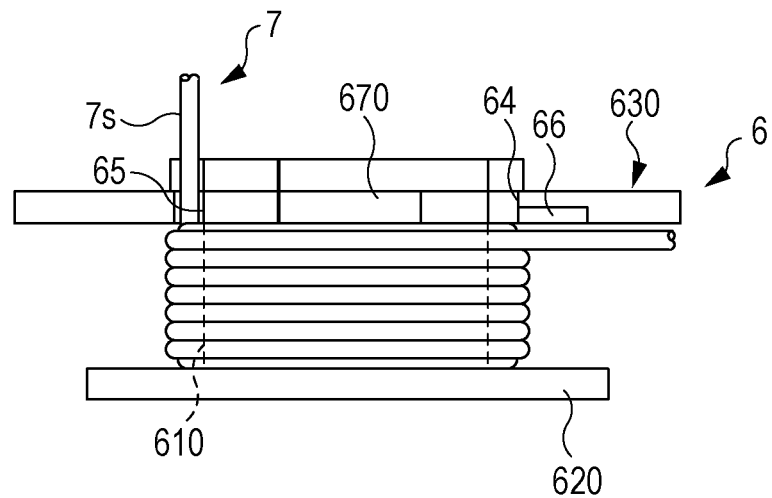
Figure 7A:
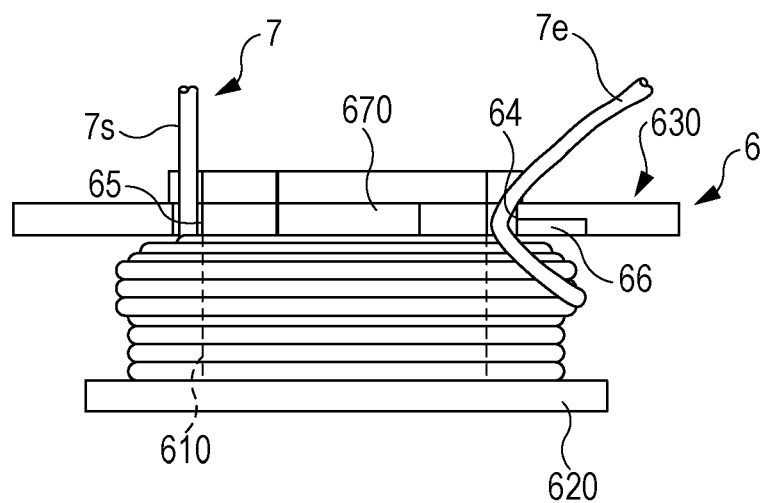
FIGS. 7A and 7B are schematic diagrams illustrating the winding process.
Figure 7B:
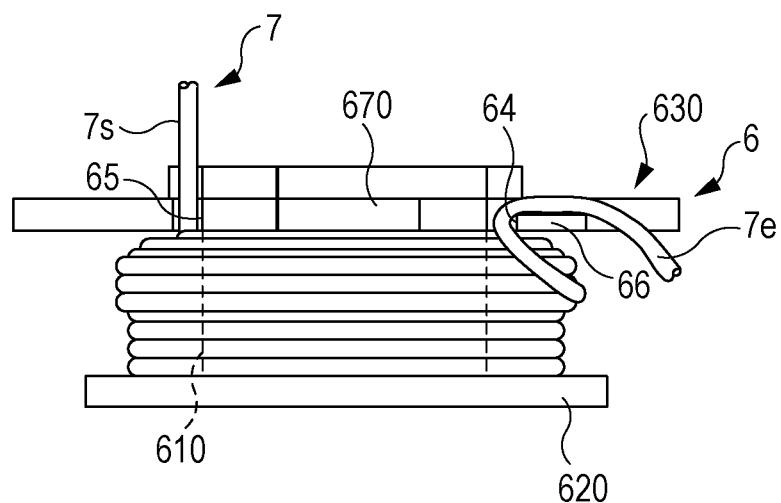

The body 610 is formed in a substantially rectangular frame shape, that is, a substantially rectangular hollow prism shape, and the tooth base portion 52 of the corresponding laminated core 5 is disposed in a hollow portion 611 of the body 610. In other words, the outer periphery of the tooth base portion 52 of the laminated core 5 is surrounded by the body 610. One of the above-described coil wires 7 is wound around the body 610 so as to form layers from the inner side toward the outer side in the radial direction of the body 610 (hereinafter referred to as "body radial direction") (see FIGS. 6 and 7 described below). The body 610 corresponds to a unit around which a coil wire is wound.

Figure 5A:
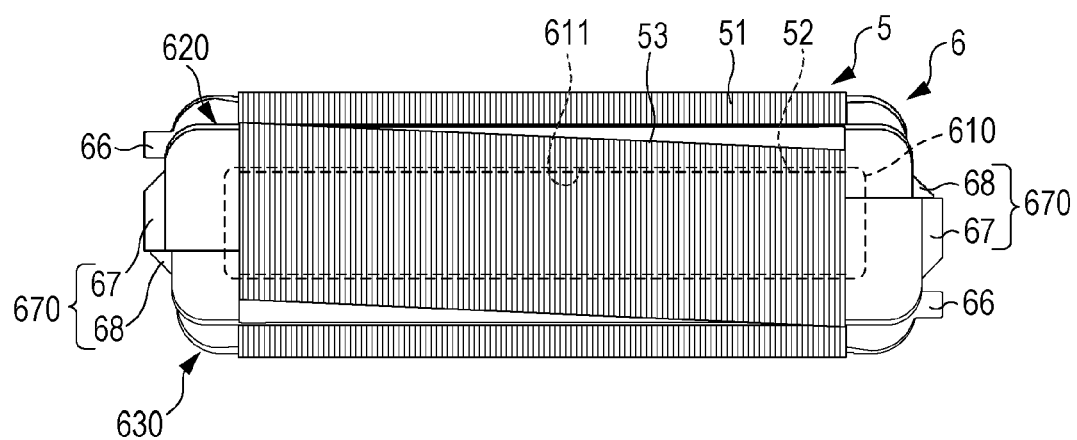
FIGS. 5A and 5B are schematic diagrams illustrating the structures of the laminated core and the insulator in the state after the insulator is attached to the laminated core.
Figure 5B:
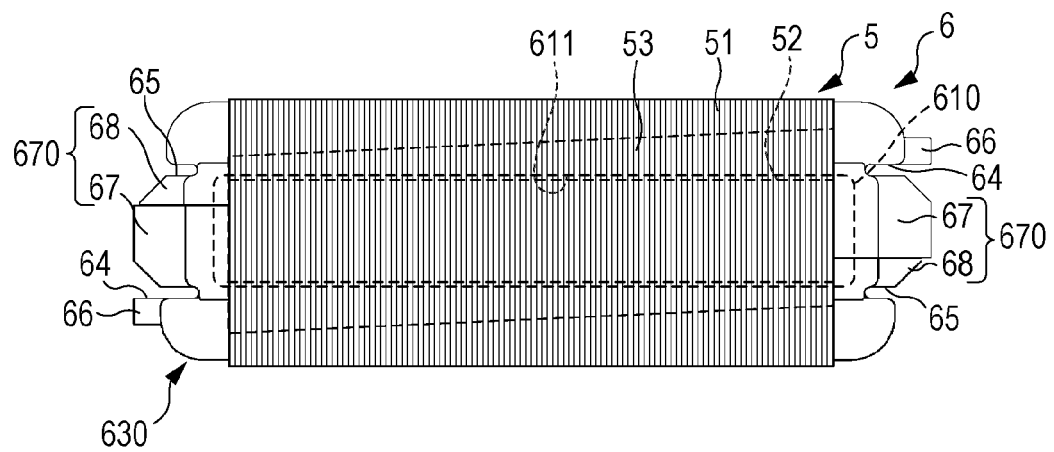

The first flange 620 projects outward in a flange shape from the edge of the hollow portion 611 of the body 610 at one open side of the body 610 (near side in FIG. 5A and far side in FIG. 5B).

The second flange 630 projects outward in a flange shape from the edge of the hollow portion 611 of the body 610 at the other open side of the body 610 (far side in FIG. 5A and near side in FIG. 5B). The second flange 630 includes, at each end thereof in the body radial direction, the first recess 64, the second recess 65, the projection 66, and a support 670 formed by combining the first support portion 67 and the second support portion 68 together. In the second flange 630, the projection 66 (first projection), the first recess 64 (first recess), the support 670, and the second recess 65 disposed at one end in the body radial direction are respectively point symmetric to the projection 66 (second projection), the first recess 64 (second recess), the support 670, and the second recess 65 disposed at the other end in the body radial direction.

A winding start portion 7s (see FIG. 6A described below) of the coil wire 7 wound around the body 610 is inserted in one of the two second recesses 65.

A winding end portion 7e (see FIG. 6A described below) of the coil wire 7 wound around the body 610 is inserted in one of the two first recesses 64 that is at the side at which the second recess 65 in which the winding start portion 7s of the coil wire 7 is inserted is located. This first recess 64 corresponds to a receiving portion in which a winding end portion of a coil wire is inserted. The position of the first recess 64 in the body radial direction is substantially the same as the position of the winding start portion 7s of the coil wire 7 in the body radial direction.

The winding end portion 7e of the coil wire 7 is bent and wound around one of the projections 66 that is at the side at which first recess 64 in which the winding end portion 7e of the coil wire 7 is inserted is located. This projection 66 corresponds to a winding portion around which a winding end portion of a coil wire is bent and wound.

The height of the support 670 in a projecting direction is substantially the same as that of the projection 66, and the top surface of the support 670 is flush with the top surface of the projection 66.

Assembly of Stator

To assemble the stator 2, first, the twelve assembly units 200 are prepared. Each assembly unit 200 is assembled by attaching an insulator 6 to a laminated core 5 and winding a coil wire 7 around the body 610 of the insulator 6.

The process of winding the coil wire 7 around the body 610 of the insulator 6 will be described below with reference to FIGS. 6A, 6B, 7A, and 7B.

Referring to FIGS. 6A, 6B, 7A, and 7B, in the winding process, the winding start portion 7s of the coil wire 7 is inserted in one of the second recesses 65. Then, the coil wire 7 is wound around the body 610 from the winding start end thereof so as to from layers from the inner side toward the outer side in the body radial direction (see FIGS. 6A and 6B). More specifically, in this example, the first layer of the coil wire 7 is formed by winding the coil wire 7 around the body 610 from the second-flange-630 side toward the first-flange-620 side at the inner side of the body 610 in the body radial direction. The second layer is formed by winding the coil wire 7 around the body 610 from the first-flange-620 side toward the second-flange-630 side at the outer side of the first layer in the body radial direction. After that, a layer formed by winding the coil wire 7 around the body 610 from the second-flange-630 side toward the first-flange-620 side at the outer side of the previous layer in the body radial direction and a layer formed by winding the coil wire 7 around the body 610 from the first-flange-620 side toward the second-flange-630 side at the outer side of the previous layer in the body radial direction are alternately arranged. In this example, the last layer of the coil wire 7 is formed by winding the coil wire 7 around the body 610 from the second-flange-630 side toward the first-flange-620 side at the outer side of the previous layer in the body radial direction. When the coil wire 7 is wound around the body 610 a predetermined number of times and the winding finish end is reached, the winding end portion 7e of the coil wire 7 that has been wound to the outer side in the body radial direction at the first-flange-620 side is largely twisted and bent to the inner side in the body radial direction at the second-flange-630 side, and is inserted in the corresponding first recess 64 (see FIG. 7A). Then, the winding end portion 7e of the coil wire 7 inserted in the first recess 64 is wound around the projection 66, and is largely twisted and bent toward the other side (outer side in the body radial direction) (see FIG. 7B). Thus, the coil wire 7 is retained by the second flange 630.

As described above, each assembly unit 200 is assembled by winding a coil wire 7 around the body 610 of an insulator 6 attached to a laminated core 5. The twelve assembly units 200 assembled in the same way are connected to each other in a substantially annular shape such that the yoke-portion-51 sides of the laminated cores 5 (the second-flange-630 sides of the insulators 6) are at the side corresponding to the outer side in the rotating-shaft radial direction). Thus, the stator 2 is produced.

Referring to FIGS. 2 and 3, the stator 2 assembled in the above-described way is attached to the frame 4 at the inner peripheral side of the frame 4 (thus, the state illustrated in FIG. 3 is established). Then, the above-described connection board 100 is attached to the twelve insulators 6 included in the stator 2 at the non-load side.

Connection Board

As illustrated in FIG. 2, the connection board 100 has twelve substantially arc-shaped (or substantially annular) conductive members 110 and a substantially annular insulating member 120.

The twelve conductive members 110 are connected with solder H to the end portions 7a of the respective coil wires 7 wound around the respective insulators 6 of the stator 2. In this example, the twelve conductive members 110 are arranged substantially concentrically so as to form four layers in the radial direction.

The insulating member 120 is formed by, for example, insert molding by using a resin material, and at least partially covers the surfaces of the twelve conductive members 110. The insulating member 120 secures the conductive members 110 at predetermined locations on a plane that is substantially orthogonal to the direction of the axis k, and provides insulation between the conductive members 110.

Figure 8:
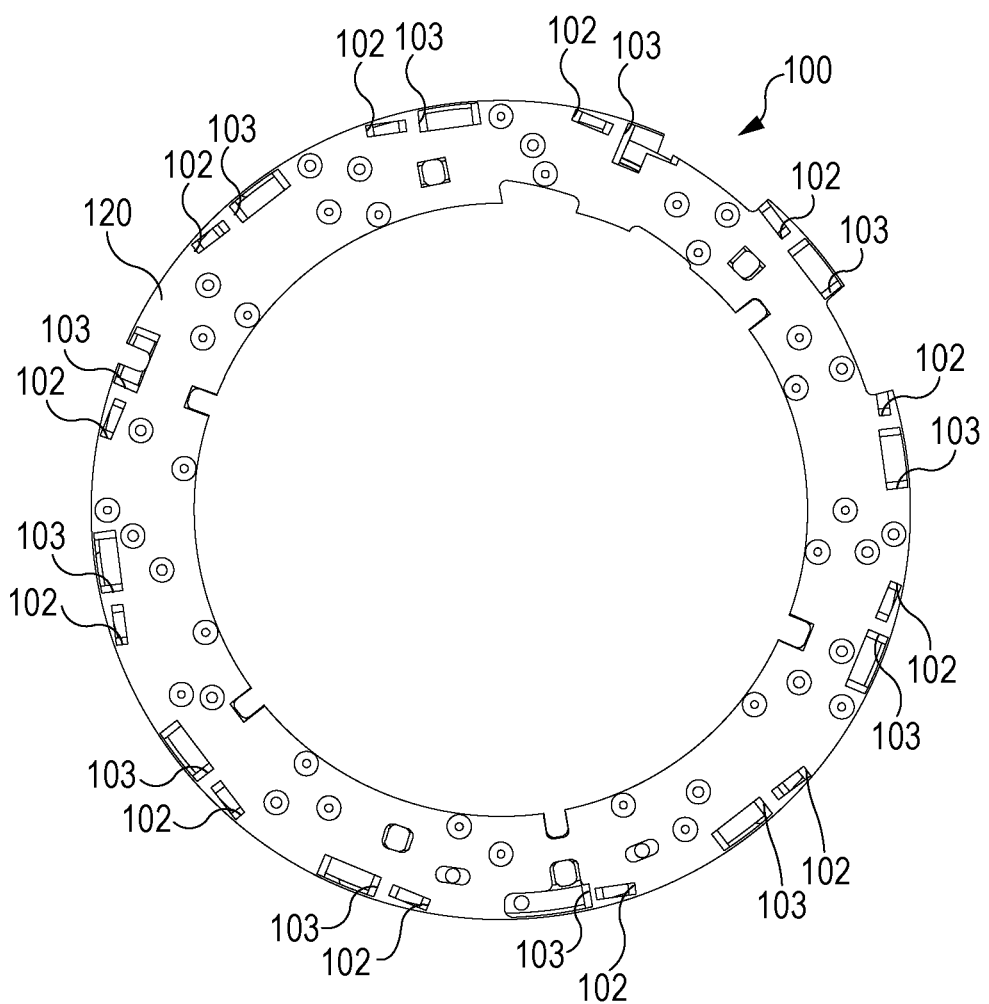
FIG. 8 is a plan view illustrating first receivers and second receivers provided in the connection board.

In addition, as illustrated in FIG. 8, twelve first receivers 102 having a recessed shape and twelve second receiver 103 having a recessed shape are formed in the annular insulating member 120 at the load side (stator-2 side) of the connection board 100.

The twelve first receivers 102 are formed in an outer peripheral region of the insulating member 120 at the load side (stator-2 side) of the connection board 100 with substantially constant intervals therebetween in the circumferential direction. The twelve first receivers 102 receive the projections 66 of the twelve insulators 6 included in the stator 2 when the connection board 100 is attached to the stator 2 (see also FIG. 9, which will be described below).

The twelve second receivers 103 are formed in an outer peripheral region of the insulating member 120 at the load side (stator-2 side) of the connection board 100 at positions adjacent to the respective first receivers 102. The twelve second receivers 103 receive the supports 670 of the twelve insulators 6 included in the stator 2 when the connection board 100 is attached to the stator 2 (see also FIG. 9, which will be described below).

Connection between Connection Board and Coil-Wire End Portions

The process of connecting the coil-wire end portions 7a to the connection board 100 will now be described.

Figure 9:
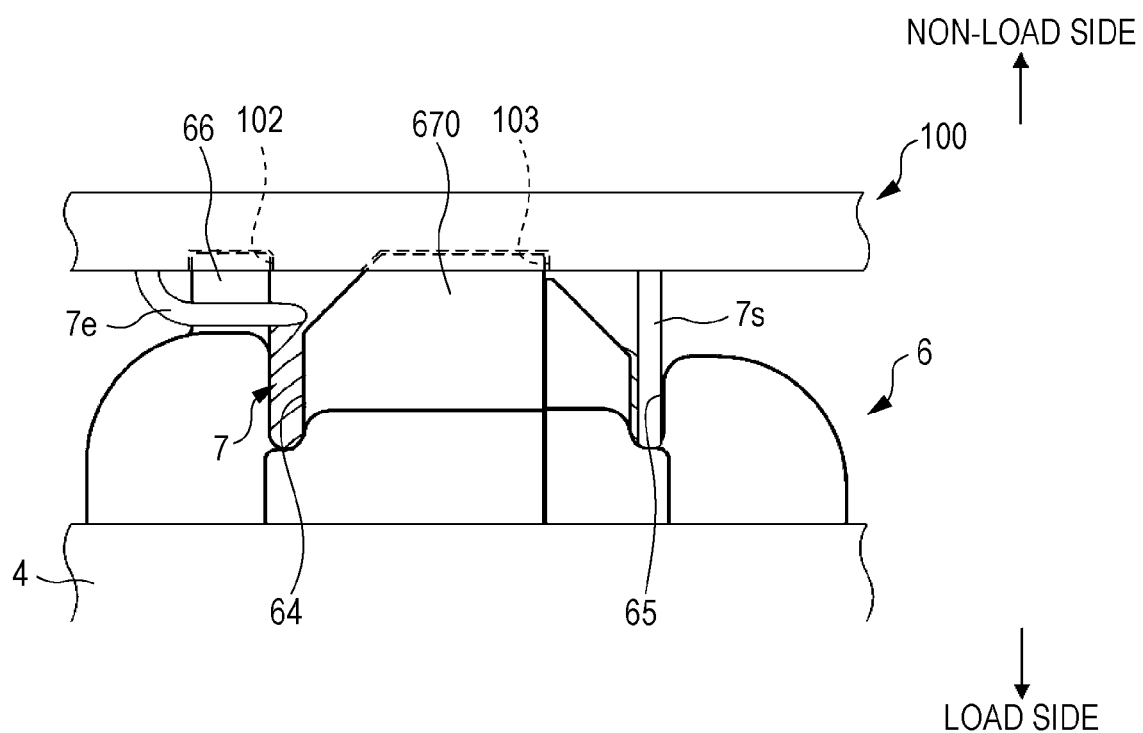
FIG. 9 is a schematic diagram illustrating the state in which a projection is accommodated in a first receiver and a support is accommodated in a second receiver.

When the stator 2 is attached to the inner periphery of the frame 4 as described above, the coil-wire end portions 7a at the winding start and winding end of each of the coil wires 7 wound around the respective insulators 6 included in the stator 2, that is, 24 coil-wire end portions 7a in total, extend outward in the direction of the axis k at the non-load side. Then, when the connection board 100 is arranged on the twelve insulators 6 included in the stator 2 at the non-load side, the coil-wire end portions 7a that extend outward are inserted through tapered holes formed in the insulating member 120 and respective through holes formed in the conductive members 110. In addition, the connection board 100 is connected to the twelve insulators 6 of the stator 2 such that each first receiver 102 receives the corresponding projection 66 and each second receiver 103 receives the corresponding support 670, as illustrated in FIG. 9. After that, unnecessary portions of the coil-wire end portions 7a are cut off so that the coil-wire end portions 7a project from the connection-side surface of the respective conductive members 110 by a certain amount. Then, soldering is performed so that the coil-wire end portions 7a are connected to the respective conductive members 110 with the solder H. Thus, the above-described 24 coil-wire end portions 7a are connected to the connection board 100 (Thus, the state illustrated in FIG. 2 is established).

Completion of Rotating Electrical Machine

Then, the connection board 100, the twelve coil wires 7 of the stator 2, etc., are integrally covered by the resin mold 15 formed by injecting a resin by an appropriate method. Thus, the stator assembly 2A including the stator 2, the rotating shaft 10, and the resin mold 15 is formed. Then, the load-side bracket 11 and the non-load-side bracket 13 are attached to the stator assembly 2A, and the rotating shaft 10 to which the rotor 3 is attached is attached to the load-side bearing 12 provided on the load-side bracket 11 and the non-load-side bearing 14 provided on the non-load-side bracket 13. Thus, the rotating electrical machine 1 is completed.

Advantageous Effects of Present Embodiment

As described above, in each of the insulators 6 according to the present embodiment, the coil wire 7 is wound around the body 610. The coil wire 7 is wound around the body 610 from the winding start end thereof. When the coil wire 7 is wound around the body 610 a predetermined number of times and the winding finish end is reached, winding of the coil wire 7 is finished. In the case where this winding process is automated, the winding start portion 7s of the coil wire 7 is pressed toward the inner side in the body radial direction as the following portion of the coil wire 7 is wound, and is not easily unwound. In contrast, the winding end portion 7e of the coil wire 7 is not pressed as described above. Therefore, even when an appropriate tension is applied while the coil wire 7 is being wound, there is a risk that the winding end portion 7e will be unwound and the winding shape will be deformed after the winding process. To avoid this, the winding end portion 7e of the coil wire 7 needs to be secured with a piece of tape, for example, and it is difficult to automate the winding process.

In the present embodiment, the second flange 630 is provided at one open side of the hollow portion 611 of the body 610, and the first recesses 64 that extend toward the body 610 are formed in the second flange 630. Accordingly, after the winding process, the winding end portion 7e of the coil wire 7 that has been wound can be inserted in one of the first recesses 64 and then twisted and bent, so that the coil wire 7 can be easily retained in a stable manner by the second flange 630. As a result, the above-described deformation of the winding shape can be prevented without using a piece of tape or the like, and the winding process can be easily automated.

In particular, in the present embodiment, the second flange 630 includes the projections 66 located adjacent to the respective first recesses 64. Accordingly, after the winding end portion 7e of the coil wire 7 is arranged so as to through one of the first recesses 64, the winding end portion 7e can be wound around the projection 66 that is located adjacent to the first recess 64 in which the winding end portion 7e is inserted, and then be twisted and bent. Thus, the coil wire 7 can be reliably retained by the second flange 630.

In addition, in the present embodiment, the body portions 61 that form the body 610 and the second flange portions 63 that form the second flange 630 are formed integrally with each other by resin molding. Accordingly, the insulating components 60, each of which includes a body portion 61 and a second flange portion 63, can be easily formed as resin-molded components having an integral structure. In addition, each insulating component can be formed simply by additionally forming projections and recesses in a second flange having the structure of the related art, and changes in the mold used for resin molding can be minimized. As a result, the manufacturing cost can be reduced.

In addition, in the present embodiment, the coil wire 7 is wound around the body 610 to form layers from the inner side toward the outer side in the body radial direction. As a result, as described above, the winding start portion 7s of the coil wire 7 is located at the inner side in the body radial direction, while the winding end portion 7e of the coil wire 7 is located at the outer side of the winding start portion 7s in the body radial direction. In the present embodiment, the position of each first recess 64 in the second flange 630 in the body radial direction is substantially the same as the position of the winding start portion 7s of the coil wire 7 in the body radial direction. Accordingly, the winding end portion 7e of the coil wire 7 wound to the outer side in the body radial direction can be inserted in the corresponding first recess 64 by largely twisting and bending the winding end portion 7e to the inner side in the body radial direction, and then largely twisted and bent toward the opposite side at the projection 66. When the winding end portion 7e is largely bent in this manner, the coil wire 7 can be securely retained by the second flange 630.

In addition, in the present embodiment, the projection 66 and the recess 64 located at one end of the second flange 630 in the body radial direction are respectively point symmetric to the projection 66 and the first recess 64 located at the other end in the body radial direction. The insulator 6 is formed as a combination of two insulating components 60, each of which includes a single projection 66 and a single first recess 64. In the present embodiment, since the insulating components 60 have exactly the same shape, a common mold can be used and the cost can be reduced accordingly.

In addition, in the present embodiment, the second flange 630 of each insulator 6 includes the supports 670, whose height is substantially the same as that of the projections 66. In addition, the connection board 100 includes the first receivers 102, which have a recessed shape and receive the respective projections 66, and the second receivers 103, which have a recessed shape and receive the respective supports 670. Accordingly, when the connection board 100 is attached to the twelve insulators 6, which is included in the stator 2 and which have been subjected to the above-described winding process, the connection board 100 can be reliably positioned with respect to the stator 2 in the circumferential direction by inserting the projections 66 into the respective first receivers 102 and inserting the supports 670 into the respective second receivers 103. In addition, at this time, since the height of the supports 670 is substantially the same as that of the projections 66, when the projections 66 and the supports 670 are inserted into the receivers 102 and 103, respectively, the connection board 100 can also be positioned with respect to the stator 2 in the height direction (in other words, in the axial direction of the stator 2). In addition, the supports 670 and the projections 66 of the insulators 6 can be brought into tight contact with the connection board 100 and secured at the same time. Accordingly, the open side of one of the first recesses 64 of each insulator 6 is blocked by the connection board 100 so that a closed space is formed therebetween, and the winding end portion 7e of the coil wire 7 inserted in the first recess 64, which is adjacent to the corresponding projection 66, is trapped in the space between the first recess 64 and the connection board 100 (see FIG. 9). As a result, the winding shape of each insulator 6 can be more reliably maintained.

Modifications and Others

Embodiments are not limited to the above-described configurations, and various modifications are possible within the gist and technical concept of the embodiments.

For example, in the above-described embodiment, the stator 2 is formed by connecting twelve assembly units 200 in a substantially annular form. However, the number of assembly units 200 connected to form the stator 2 may be smaller or greater than twelve.

In addition, in the above-described embodiment, the height of the projections 66 is substantially the same as that of the supports 670. However, the height of the projections 66 may be different from that of the supports 670.

In addition, in the above-described embodiment, the position of the first recesses 64 in the body radial direction is substantially the same as the position of the winding start portion 7s of the coil wire 7 in the body radial direction. However, the position of the first recesses 64 in the body radial direction may be different from the position of the winding start portion 7s of the coil wire 7 in the body radial direction.

In addition, in the above-described embodiments, each insulator 6 is formed by combining two insulating components 60 having the same shape, and the projection 66 and the recess 64 at one end of the second flange 630 in the body radial direction are respectively point symmetric to the projection 66 and the first recess 64 at the other end of the second flange 630 in the body radial direction. However, even when an insulator is formed by combining two insulating components as described above, the insulating components may have different shapes and it is not necessary that a projection and a recess at one end of a flange in the body radial direction be respectively point symmetric to a projection and a first recess at the other end of the flange in the body radial direction. Alternatively, even when an insulator is formed by combining two insulating components as described above, the insulating components may have different shapes and a projection and a recess may be provided only at one end of a flange in the body radial direction. In addition, the insulator may be formed of a single insulating component or three or more insulating components. In the case where the insulator is formed of a single insulating component, a single projection and a single recess may be provided at each end of the flange. Alternatively, a single projection and a single recess may be provided only at one end of the flange. In the case in which the insulator is formed of a single insulating component, the body and the flange of the insulator may be integrated together by resin molding, or be formed separately.

In addition, in the above-described embodiment, the body portion 61 and the second flange portion 63 of each insulating component 60 are formed integrally with each other by resin molding. However, the body portion 61 and the second flange portion 63 of each insulating component 60 may be formed separately from each other.

In addition, in the above-described embodiment, the projections 66 are formed adjacent to the respective first recesses 64. However, it is not necessary to form the projections 66, and the projections 66 may be omitted.

In addition, in the above-described embodiment, two flanges 620 and 630 are provided at both open sides of the body 610. However, the body 610 may be formed such that only one single flange is provided at one open side thereof.

In addition, in the above-described embodiment, the rotating electrical machine 1 is an inner-rotor-type electric motor in which the rotor 3 is disposed inside the stator 2. However, the rotating electrical machine may instead be an outer-rotor-type electric motor in which the rotor 3 is disposed outside the stator 2. In addition, the rotating electrical machine is also applicable to a power generator.

Furthermore, techniques according to the above-described embodiment and modifications may be applied in combination.

It should be understood by those skilled in the art that various modifications, combinations, sub-combinations and alterations may occur depending on design requirements and other factors insofar as they are within the scope of the appended claims or the equivalents thereof.

What is claimed is:

1. A stator assembly comprising:
   a stator including a plurality of insulators to be attached to a stator core of a rotating electrical machine, each of the insulators comprising:
      a frame-shaped body which surrounds the stator core and around which a coil wire is wound; and
      a flange provided at least at one of open sides of the body, the flange having at least one recess that extends toward the body and at least one projection located adjacent to the recess;
   a connection portion that is provided on the plurality of insulators at one side of the insulators in an axial direction and to which end portions of the coil wires of the respective insulators are connected; and
   a resin mold that covers the connection portion and the coil wires,
   wherein the flange of each insulator further includes a support whose height in a projecting direction is substantially the same as a height of the projection in the projecting direction, and
   wherein the connection portion includes
      first receivers that have a recessed shape and receive the projections of the flanges of the respective insulators, and
      second receivers that have a recessed shape and receive the supports of the flanges of the respective insulators.

2. A rotating electrical machine comprising:
   the stator assembly according to claim 1;
   a rotating shaft disposed inside the stator; and
   a rotor fixed to the rotating shaft.

3. A connection board to which end portions of coil wires wound around respective insulators are to be connected, the connection board comprising:

a plurality of conductive members to be connected to the end portions to the coil wires of the respective insulators; and an insulating member that at least partially covers surfaces of the conductive members, wherein each of the insulators includes a body around which the corresponding coil wire is wound, and a flange that is provided on the body and that includes at least one recess that extends toward the body, at least one projection located adjacent to the recess, and a support whose height in a projecting direction is substantially the same as a height of the projection in the projecting direction, and wherein the insulating member includes first receivers that have a recessed shape and receive the projections of the flanges of the respective insulators, and second receivers that have a recessed shape and receive the supports of the flanges of the respective insulators.

\* \* \* \* \*